2,953,492
METHOD OF CONTROLLING NEMATODES BY APPLYING IMIDAZOLE

William E. Duggins, Berkeley Heights, N.J., assignor to General Aniline & Film Corporation, New York, N.Y., a corporation of Delaware No Drawing. Filed Jan. 31, 1958, Ser. No. 712,294

3 Claims. (Cl. 167—33)

The present invention relates to a method of controlling and eradicating insects and nematodes from loci in which they are found.

Practically all of the nematocides now in general use are toxic to humans and to various plant species. The two nematocides widely employed in the control and eradication of soil nematodes are DD (a mixture of 1,3-dichloropropylene and 1,2-dichloropropane) and ethylene dibromide. Both of these emit vapors, breathing of which is dangerous to health and if spilled on the skin will cause irritation. As far as toxicity to plants is concerned, this is so pronounced that manufacturers recommend that they be diffused out of the soil before a crop is planted.

It is an object of the present invention to provide an improved method of protecting loci of chlorophyllaceous plants against destructive insects and nematodes by treatment of said loci with imidazole.

It is a further object to provide a method of controlling and eradicating insects and nematodes by means of imidazole which is non-toxic to plants and relatively non-toxic to humans within certain limits of concentration.

Other objects and advantages will become more clearly apparent from the following description.

I have found that imidazole (1,3-diazole) is freely soluble in water and very effective as an insecticide and nematocide. In view of its solubility in water, it is readily dispersed in soil solution when employed as a soil nematocide. Moreover, the compound is neither a primary irritant nor a skin sensitizer and has a low mammalian toxicity. The imidazole is readily adaptable for insecticidal purposes and soil fumigation without the need of special handling precautions. It can be diluted with water to proper concentration for immediate use either in the field or greenhouse.

The amount of imidazole to be employed as a nematocide is not critical and the actual amount to be employed is readily determined by routine experiments. For practical purposes, I have found that from 5 to 500 parts per million parts of soil is sufficient to control, and in the majority of cases to substantially eradicate, all species of nematodes inhabiting agricultural and greenhouse soils. As an insecticide, it may be employed in a concentration of 1 to 5% by weight in aqueous solution.

Imidazole can also be applied to the soil before cultivation as a dust or in granular form. When applied in this manner, it can be formulated with fertilizer or limestone. It can, of course, be formulated with exploded mica, fuller's earth, bentonite, etc., to give a more uniform distribution. Moreover, it has been discovered that in addition to being a nematocide, imidazole is also an effective insecticide against pests such as the Mexican bean beetle and the southern army worm.

The following examples will illustrate the manner in which the imidazole is employed in the control and eradication of insects and nematodes.

Example I 100 gram samples of dry sand were mixed with 5 gram samples of a brei of tomato roots infested with root-knot nematocides (*Meloidogyne incognita*). This mixture was transferred to clay pots and 15 mm. of the test chemical was added to the mixture. The pot was then wrapped in Saran and allowed to stand for 24 hours. The mixture was transferred to stainless steel cylindrical screens (100 mesh). The screen was placed in the bottom half of a 9 cm. Petri dish containing 25 ml. of water and covered with the Petri dish cover. An additional 10 ml. of distilled water was added to each plate in order that free water would be available in the dish. After 24 hours microscopic counts were made of the living nematodes which migrated through the screen and into the Petri dish.

| Nematocide | Nematodes-living | Nematodes-dead |
|---|---|---|
| Imidazole | 8 | 4 |
| Control | 80 | 35 |

For field and greenhouse applications, it is desirable that the imidazole be prepared in the form of an aqueous solution of the desired concentration and applied to the soil when the soil temperature is in the range of 50 to 80° F. Application above 80° F. has no adverse effect. Satisfactory results are obtained not only in the control but eradication of various species of cyst-forming nematodes, endoparasitic nematodes, ectoparasitic nematodes and background feeders such as *Aphelenchoides ritzemabosi*. The following excellent results were obtained by treatment of soil prior to the raising of the following vegetables and small fruits:

| | |
|---|---|
| Bean, lima | Lettuce |
| Brussels sprout | Parsnip |
| Cantaloupe | Spinach |
| Carrot | Squash |
| Celery | Tomato |
| Corn, sweet | Turnip |

Example II

Fourth instar larvae of the Mexican bean beetle, *Epilachna varivestis*, less than one day old within the instar and reared on Tendergreen beans under greenhouse conditions, constituted the test insect for this screening method. The test larvae were removed from the colony and held without food, in a glass dish, for 4 hours prior to being placed on the treated foliage.

Paired seed leaves, excised from Tendergreen bean plants, were dipped in the test formulations until they were thoroughly wetted. Excess liquid was removed by gentle shaking. While the leaves were drying in a ventilated hood, wilting was prevented by placing the stem in water. When dry, the paired leaves were separated and each placed in a 9 cm. Petri dish lined with filter paper. Then randomly selected larvae were introduced before closing the dish.

The closed dishes were labeled and held at 75 to 85° F. for 3 days. Although the larvae can easily consume the whole leaf within 24 hours, no more food was added. Check larvae remain vigorous during the entire holding period and do not advance to the quiescent prepupal state.

Larvae which are unable to move the length of the body (translocate), even upon stimulation by prodding, were considered dead. Possible repellent qualities of the test compounds were recorded as percentage feeding inhibition. While not excluding the possibility of contact insecticidal action, this test indicates chemcials which display repellent or stomach poison effects in the contact action.

| Insecticide | p.p.m. | Living | Dead | Percent Killed | Percent Feeding Inhibition |
|---|---|---|---|---|---|
| Imidazole | 2,000 | 0 | 10 | 100 | 80 |
| Do | 1,000 | 9 | 1 | 10 | 0 |
| Do | 500 | 10 | 0 | 0 | 0 |
| Do | 250 | 10 | 0 | 0 | 0 |
| Control | 0 | 10 | 0 | 0 | 0 |

Salts of imidazole such as the hydrochloride, sulfate, nitrate, acetate, oxalate, etc., can also be utilized as nematocides and insecticides instead of imidazole itself.

I claim:

1. The method of protecting loci against nematodes which comprises applying to said loci a nematocidal amount of imidazole.

2. The method of fumigating soil which comprises introducing to the soil a fumigating amount of imidazole.

3. A process of controlling and eradicating nematodes from soil which comprises introducing to said soil in the vicinity of said nematodes a nematocidal amount of imidazole.

References Cited in the file of this patent

UNITED STATES PATENTS

| | | |
|---|---|---|
| 1,982,909 | Flint | Dec. 4, 1934 |
| 2,057,044 | Meisenburg | Oct. 13, 1936 |
| 2,377,446 | Payne | June 5, 1945 |
| 2,419,073 | Hammer | Apr. 15, 1947 |
| 2,435,204 | Davidson | Feb. 3, 1948 |
| 2,473,984 | Bickerton | June 21, 1949 |
| 2,502,244 | Carter | Mar. 28, 1950 |
| 2,543,580 | Kay | Feb. 27, 1951 |
| 2,726,485 | Thomas | Dec. 13, 1955 |
| 2,730,547 | Dye | Jan. 10, 1956 |
| 2,743,209 | Jones | Apr. 24, 1956 |
| 2,770,638 | Giolito | Nov. 13, 1956 |
| 2,779,680 | Wolf | Jan. 29, 1957 |
| 2,794,727 | Barrous | June 4, 1957 |
| 2,802,021 | Heininger | Aug. 6, 1957 |
| 2,802,818 | Wheeler | Aug. 13, 1957 |

OTHER REFERENCES

King: Chemicals Evaluated as Insecticides, U.S. Dept. Agr. Handbook No. 69, pp. 3-6 and 11-13, 196, May 1954.

Elderfield: Heterocyclic Compounds, vol. 5, pp. 196-7, April 1957.